(12) United States Patent
Hasegawa

(10) Patent No.: US 6,445,341 B2
(45) Date of Patent: Sep. 3, 2002

(54) GPS RECEIVER AND GPS RECEPTION METHOD

(75) Inventor: Koji Hasegawa, Kanagawa (JP)

(73) Assignees: Sony Corporation, Tokyo (JP); Sony Chemicals Corporation, Tokyo (JP)

(*) Notice: Subject to any disclaimer, the term of this patent is extended or adjusted under 35 U.S.C. 154(b) by 0 days.

(21) Appl. No.: 09/795,939

(22) Filed: Feb. 28, 2001

(30) Foreign Application Priority Data

Mar. 2, 2000 (JP) ........................................ 2000-057813

(51) Int. Cl.$^7$ .............................. G01S 5/02; G01S 5/14; H04B 7/185
(52) U.S. Cl. .............................. 342/357.13; 342/357.12
(58) Field of Search ....................... 342/357.06, 357.12, 342/357.13

(56) References Cited

U.S. PATENT DOCUMENTS 5,594,453 A * 1/1997 Rodal et al. ............ 342/357.15

2001/0012760 A1 * 8/2001 Avis ........................ 455/13.2

* cited by examiner

*Primary Examiner*—Thomas H. Tarcza
*Assistant Examiner*—Fred H Mull
(74) *Attorney, Agent, or Firm*—Frommer Lawrence & Haug LLP; William S. Frommer

(57) ABSTRACT

A GPS receiver is disclosed wherein GPS position measurement can be performed in a short time without the necessity to wait for periodical time information from a GPS satellite and power consumption is minimized also with a minimized position measurement time. The GPS receiver includes a GPS antenna section for receiving a signal having a signal frequency of a high accuracy from a GPS satellite, a GPS block including a frequency oscillator for generating a frequency and operable to use the frequency from the frequency oscillator to read orbit information placed in the signal from the GPS satellite in synchronism with the signal and enter itself into a standby mode, and a GPS control block having a timer function for rendering the GPS block after entered into the standby mode into an activated mode based on the timer function.

6 Claims, 10 Drawing Sheets

FIG. 9

| TIME | 13:30 | 13:45 | 14:00 | 14:15 | 14:30 | 14:45 | 15:00 | 15:15 | 15:30 | 15:45 | 16:00 | 16:15 | 16:30 | 16:45 | 17:00 | 17:15 | 17:30 | 17:45 | 18:00 | 18:15 | 18:30 | 18:45 | 19:00 | 19:15 |
|---|---|---|---|---|---|---|---|---|---|---|---|---|---|---|---|---|---|---|---|---|---|---|---|---|
| NUMBER | 18 | 18 | 18 | 18 | 18 | 18 | 18 | | | | | | | | | | | | | | | | | |
| | 13 | 13 | 13 | 13 | 13 | 13 | 13 | 13 | 13 | 13 | 13 | 13 | 13 | 13 | 13 | 13 | 13 | 13 | | | | | | |
| | | 7 | 7 | 7 | | | | | | | | | | | | | | | | | | | | |
| | | | | | | | | | | | | | | 6 | 6 | 6 | 6 | | | | | | | |
| | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| | 24 | 24 | 24 | 24 | 24 | 24 | | | | | | | | | | | | | | | | | | |
| | | | | | | | | | | | | | | | | | | | | | 2 | 2 | 2 | 2 |
| | 27 | 27 | 27 | 27 | 27 | 27 | 27 | 27 | 27 | 27 | 27 | 27 | 27 | 27 | 27 | 27 | 27 | 27 | 27 | 27 | | | | |
| | | | | | | | | | | | | | | | | | | | | 23 | 23 | 23 | 23 | 23 |
| | 19 | 19 | 19 | 19 | 19 | 19 | 19 | 19 | 19 | 19 | 19 | | | | | | | | | | | | | |
| | | | | | | | | | | | | | | | | | | | | | | 5 | 5 | 5 |
| | | | | | | | | | | | | | | 17 | 17 | 17 | 17 | 17 | 17 | 17 | 17 | 17 | 17 | 17 |
| | 4 | 4 | 4 | 4 | 4 | 4 | 4 | 4 | 4 | 4 | 4 | 4 | 4 | | | | | | | | | | | |
| | | | | | | | | | | | | | | 9 | 9 | 9 | 9 | 9 | 9 | 9 | 9 | 9 | 9 | 9 |
| NUMBER OF SATELLITES | 8 | 8 | 8 | 8 | 7 | 7 | 7 | 6 | 6 | 6 | 6 | 6 | 5 | 4 | 4 | 4 | 4 | 4 | 3 | 3 | 2 | 2 | 2 | 2 |

GPS RECEIVER AND GPS RECEPTION METHOD

BACKGROUND OF THE INVENTION

This invention relates to a navigation system for a mobile unit such as a car navigation system, and more particularly to a GPS receiver and a GPS reception method wherein GPS (Global Positioning System) position measurement can be performed in a short time.

The GPS system is a position measurement system developed to allow a mobile unit such as an aircraft or a ship to determine the position on the earth or the velocity of the mobile unit on the real time basis utilizing GPS satellites which orbit around the earth. Recently, the GPS system is utilized widely in the field of the static survey for measuring the distance or the direction between different spots on the earth and like fields in addition to the position measurement by a mobile unit. In order to utilize the GPS system, a GPS receiver for receiving radio waves radiated from GPS satellites is used.

FIG. 10A shows a general construction of a GPS system used popularly, and FIG. 10B illustrates a conventional GPS position measurement operation. Referring first to FIG. 10A, a spread spectrum signal of 1.57542 GHz is transmitted from a GPS satellite 200. An antenna section 211 of a GPS receiver 210 receives the transmitted signal after a propagation time which relies upon the distance between the GPS satellite 200 and the GPS receiver 210. The signal received by the antenna section 211 is down converted into a signal of a predetermined intermediate frequency by a radio frequency (RF) section 212 and then supplied to a signal synchronizing demodulation section 213. The intermediate frequency signal is despread into demodulated data by the signal synchronizing demodulation section 213. The demodulated data is used for position measurement calculation by a signal processing section 214. In this manner, the signal transmitted from the GPS satellite 200 is received and used for position measurement calculation by the GPS receiver 210.

FIG. 10B illustrates a conventional GPS position measurement operation performed by the GPS receiver 210. First, when power supply to the GPS receiver 210 is made available, a frequency search is performed. The frequency search is performed in order to synchronize a frequency of a low accuracy produced by a frequency oscillator 215 in the GPS receiver 210 and having an error with a signal frequency of a high accuracy transmitted from the GPS satellite 200. If some correlation between the frequencies is detected, then the GPS receiver 210 perform a PLL (Phase Locked Loop) operation for adjustment in phase to synchronize the internal frequency fully with that of the signal from the GPS satellite 200. Then, after an edge at a bit boundary is detected and therefore data can be fetched, time information is confirmed. In particular, the TOW (Time Of Week) placed in the second word of a subframe in a hierarchical navigation message and representative of a signal time within one week in the period of 6 seconds is fetched. After the TOW is fetched, position measurement calculation is started. After the position measurement calculation is completed, position measurement data is outputted, and the current position is calculated finally.

In this manner, the GPS position measurement method requires the frequency oscillator 215 for capturing a signal from the GPS satellite 200, and in order to establish synchronism with a signal frequency of a high accuracy transmitted from the GPS satellite 200, it is required that the frequency oscillator 215 is high in accuracy. However, the oscillation frequency of the frequency oscillator 215 is fluctuated generally by a temperature or a secular change. This fluctuation prevents easy capture of the signal from the GPS satellite 200 through the use of the frequency oscillator 215, and therefore, a scheme of a frequency search must be provided separately. Since the frequency search usually requires much time, a considerably long time is required until the current position is calculated finally.

Further, in the conventional GPS position measurement method, the time required after the signal from the GPS satellite 200 is captured until all of absolute time information included in the signal is acquired is approximately 6 seconds even upon hot starting, with which the time is minimized, and in the best conditions, but usually, a time of tens and several seconds is required. Further, since position measurement calculation is performed using the acquired absolute time information, a considerably long time is required until the current position is calculated.

Furthermore, in the conventional GPS position measurement method, when position measurement is performed again after a time longer than a fixed interval of time elapses, time for fetching a navigation message newly is required. Therefore, a considerably long time is required until the current position is calculated.

Where much time is required for GPS position measurement from such reasons as described above, for example, in a car navigation system, the current position cannot be discriminated immediately after power supply is made available. This raises a problem that the route to a destination cannot be discriminated rapidly or the current position is unsettled due to an error of the self-contained navigation and this increases time until the correct position is discriminated. Further, in an apparatus of the type wherein a GPS receiver is built in or connected to a recent portable information terminal, where it is tried to use the apparatus principally during walking of the user, since the current position cannot be discriminated rapidly, the user must wait at a place with the apparatus held in hand until the position measurement is completed, which is very inconvenient.

On the other hand, also it is a possible idea to perform position measurement with power supply normally kept on. However, this causes the apparatus to consume very much power. Where the apparatus is particularly limited in power consumption like, for example, a car navigation system or a portable navigation system, it is not preferable to normally keep the power supply on.

SUMMARY OF THE INVENTION

It is an object of the present invention to provide a GPS receiver and a GPS reception method wherein GPS position measurement can be performed in a short time without the necessity to wait for periodical time information from a GPS satellite.

It is another object of the present invention to provide a GPS receiver and a GPS reception method wherein power consumption is minimized also with a minimized position measurement time.

In order to attain the objects described above, a GPS receiver to which the present invention is applied holds a frequency accuracy, a time accuracy and a navigation message and repeats its startup and standby taking a cumulative increase in error while it remains in a standby state into consideration. In particular, according to an aspect of the present invention, there is provided a GPS receiver, including reception means for receiving time information transmitted from a GPS satellite, holding means for holding the time information received by the reception means, standby mode setting means for setting the reception means to a standby mode, and start condition setting means for starting up the reception means after a predetermined time elapses after the reception means is set to the standby mode by the standby mode setting means.

With the GPS receiver, the time required for position measurement thereof can be reduced without waiting for periodical time information from a GPS satellite. Further, also where the position measurement time is reduced, the power consumption of the GPS receiver is reduced.

Preferably, the standby mode setting means disconnects power supply to set the reception means to the standby mode, and the start condition setting means starts up the reception means based on an interval within which the time information held in the holding means can keep a predetermined time accuracy. This advantageously allows repetition of startup/standby of the GPS receiver while the error of the time information remains within an allowable range.

It is to be noted that the reception means may receive a frequency of a high accuracy together with the navigation message from the GPS satellite and the holding means holds a difference in frequency between the navigation message and a frequency oscillator built in the GPS receiver as an offset in addition to the time information.

According to another aspect of the present invention, there is provided a GPS receiver, including an antenna for receiving a signal having a signal frequency of a high accuracy from a GPS satellite, a GPS block including a frequency oscillator for generating a frequency and operable to use the frequency from the frequency oscillator to read orbit information placed in the signal from the GPS satellite in synchronism with the signal and enter itself into a standby mode, and a GPS control block having a timer function for rendering the GPS block after entered into the standby mode into an activated mode based on the timer function.

Also with the GPS receiver, the time required for position measurement thereof can be reduced without waiting for periodical time information from a GPS satellite. Further, also where the position measurement time is reduced, the power consumption of the GPS receiver is reduced.

Preferably, the GPS receiver further includes a memory for storing a difference between a signal frequency of the signal from the GPS satellite and a prescribed synchronizing frequency as an offset, and wherein the GPS block updates the offset stored in the memory when the GPS block is caused to enter the activated mode by the GPS control block. The GPS receiver is advantageous in that a normally updated offset value is stored in the memory and, for example, immediately after power supply to the GPS receiver is made available by a user of the GPS receiver, an accurate current position of the GPS receiver can be displayed. In particular, when a predetermined time elapses after the power supply is disconnected, the oscillation frequency of the frequency oscillator is fluctuated, and this fluctuates the offset which is a difference between the oscillation frequency and the prescribed synchronizing frequency of a demodulator of the GPS receiver. In the a GPS receiver, however, since the memory normally holds an updated offset value, an accurate current position of the GPS receiver can be displayed immediately after power supply to the GPS receiver is made available.

Preferably, the GPS block transmits a setting signal indicative of a time interval until the GPS block is to be started up subsequently to the GPS control block, and the GPS control block transmits the standby signal to the GPS block after the GPS control block receives the setting signal from the GPS block. This allows the GPS control block to perform the control of startup/standby of the GPS receiver and thus provides an advantage in that such a trouble that the GPS block cannot be started up any more or cannot stand by any more can be prevented.

According to a further aspect of the present invention, there is provided a GPS reception method for a GPS receiver, including the steps of receiving a hierarchical navigation message from each of a plurality of GPS satellites, storing the received navigation messages into a memory, repeating startup and standby of the GPS receiver within a predetermined time to perform position measurement of the GPS receiver from the GPS satellites to update the navigation messages stored in the memory, and outputting, immediately after power supply to the GPS receiver is made available by a user of the GPS receiver, a current position of the GPS receiver based on the navigation messages stored in the memory without performing reception of the navigation message from any of the GPS satellites.

Also with the GPS reception method for a GPS receiver, the time required for position measurement of the GPS receiver can be reduced without waiting for periodical time information from a GPS satellite. Further, also where the position measurement time is reduced, the power consumption of the GPS receiver is reduced.

It is to be noted that, within the predetermined time within which startup and standby are repeated, the standby time is determined preferably taking, for example, deterioration of the accuracy of data, reduction of the number of visible satellites and so forth into consideration.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 9 is a table illustrating a validity term of a navigation message; and

DESCRIPTION OF THE PREFERRED EMBODIMENT

Figure 1:
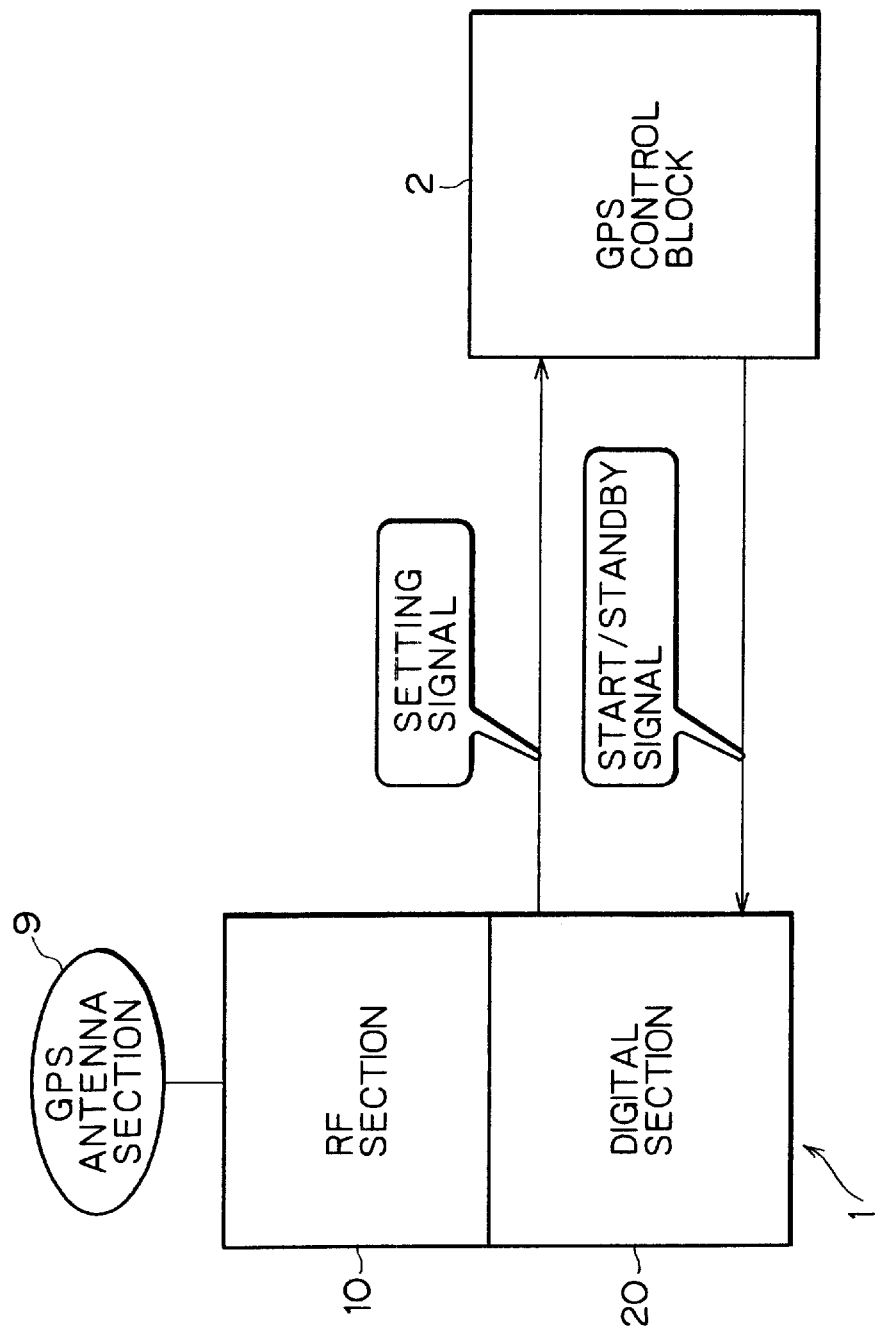
FIG. 1 is a diagrammatic view showing a general construction of a GPS receiver to which the present invention is applied.

Referring to FIG. 1, there is shown a general construction of a GPS receiver to which the present invention is applied. The GPS receiver shown includes a GPS block 1 and a GPS control block 2. The GPS block 1 includes a GPS antenna section 9 for receiving a radio wave of 1,575.42 MHz transmitted from a GPS satellite at the height of approximate 20,000 km, a radio frequency (RF) section 10 for converting the radio wave received by the GPS antenna section 9 into a signal of an intermediate frequency making use of a frequency of a frequency oscillator not shown in FIG. 1, and a digital section 20 for demodulating the radio wave signal of the intermediate frequency from the RF section 10, extracting necessary data from the radio signal of the intermediate frequency and calculating the current position of the GPS receiver based on the extracted data.

Meanwhile, the GPS control block 2 is formed from a clock or a microcomputer having a built-in clock function which can transmit a predetermined signal in a predetermined period. The GPS block 1 sends to the GPS control block 2 a setting signal indicative of a time interval after which the GPS block 1 should be started up. Upon reception of the setting signal, the GPS control block 2 sets a period in which a start signal is to be sent. The GPS control block 2 sends a start/standby signal to the GPS block 1. Upon reception of the start/standby signal, the GPS block 1 can start itself or stand by.

Figure 2:
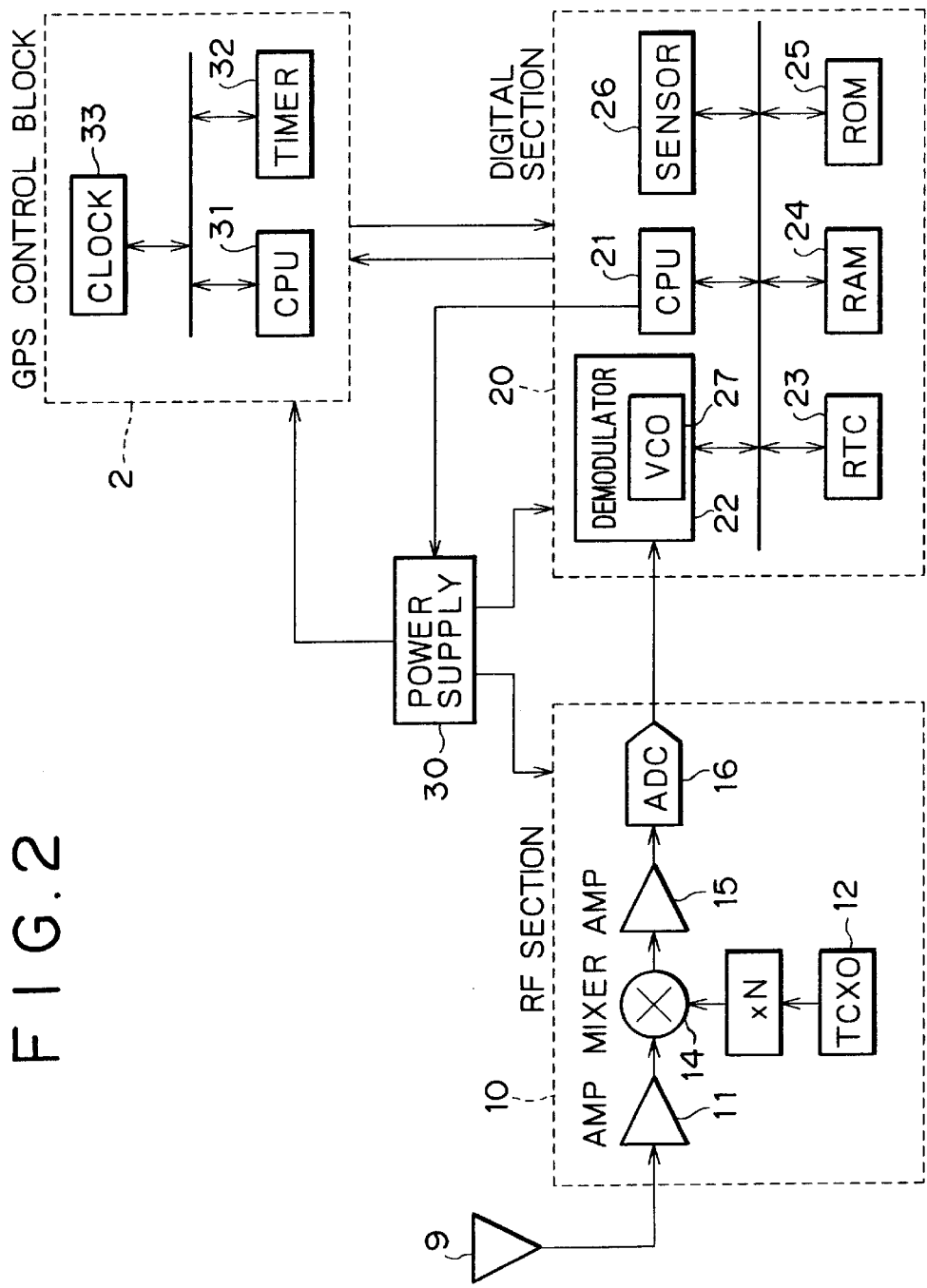
FIG. 2 is a block diagram showing a detailed construction of a GPS block and a GPS control block of the GPS receiver.

FIG. 2 shows a detailed construction of the GPS block 1 and the GPS control block 2. Referring to FIG. 2, a signal received by the GPS antenna section 9 is amplified by an amplifier (AMP) 11 of the RF section 10 of the GPS block 1. The RF section 10 has a frequency oscillator (TCXO) 12 provided therein. A frequency signal from the frequency oscillator 12 is multiplied by N times and then mixed with the signal amplified by the amplifier 11 by a mixer 14 so that the signal from the amplifier 11 is converted into an intermediate frequency signal. The intermediate frequency signal is amplified by an amplifier 15 and then converted into a digital signal by an AD converter (ADC) 16. The digital signal is inputted to the digital section 20.

The digital section 20 includes a CPU (Central Processing Unit) 21 for controlling the GPS block 1, a i-u demodulator 22 for demodulating the intermediate frequency signal, a real time clock (RTC) 23 which normally operates to provide time information, a RAM 24, a ROM 25, and a sensor 26. The demodulator 22 includes a voltage-controlled oscillator (VCO) 27 whose oscillation frequency varies with a voltage applied thereto. In the GPS receiver of the present embodiment, the difference between the intermediate frequency applied to the demodulator 22 and a synchronizing frequency of the VCO 27 can be stored as an offset into the RAM 24. The demodulator 22 functions to vary the voltage to the VCO 27 in accordance with the offset to control the frequency of the VCO 27 to a prescribed synchronizing frequency to establish synchronism with the GPS frequency from the RF section 10. The RAM 24 can store not only the offset but also time information and an acquired navigation message. The time information stored in the RAM 24 is reflected on the time information of the real time clock 23. The ROM 25 has various kinds of control information and other necessary information stored therein. The sensor 26 detects an ambient temperature in an atmosphere in which the GPS block 1 is placed. Thus, a standby time can be set based on the detected ambient temperature as hereinafter described.

The GPS control block 2 includes a CPU 31 for controlling the GPS control block 2, a timer 32, and a clock 33 for holding time of a high accuracy acquired by the GPS block 1.

The GPS receiver of the present embodiment further includes a power supply 30 for supplying power to the GPS block 1 and the GPS control block 2. The power supply 30 is controlled by the CPU 21 so that it should or should not supply power to the GPS block 1.

Figure 3:
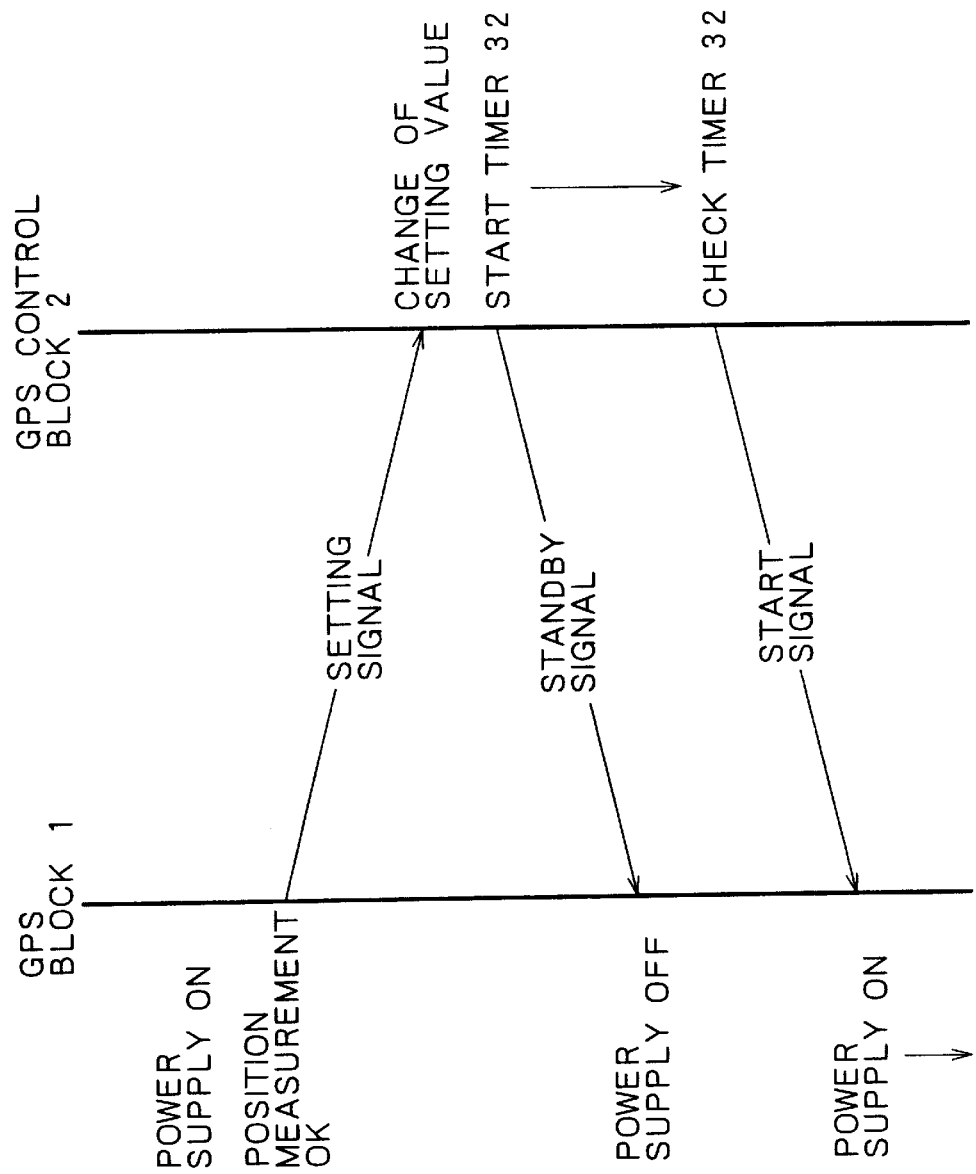
FIG. 3 is a diagrammatic view illustrating operation of and communication contents between the GPS block and the GPS control block.

FIG. 3 illustrates operation and contents of communication between the blocks 1 and 2. Referring to FIG. 3, a setting signal indicative of a time interval after which the GPS block 1 should be started up next is transmitted from the GPS block 1 to the GPS control block 2. The GPS control block 2 receives the setting signal transmitted thereto and signals a standby signal to the GPS block 1. Thereafter, the GPS control block 2 starts up and checks the timer 32. After the GPS control block 2 discriminates elapse of a predetermined time based on the check, it transmits a start signal to the GPS block 1.

Figure 4:
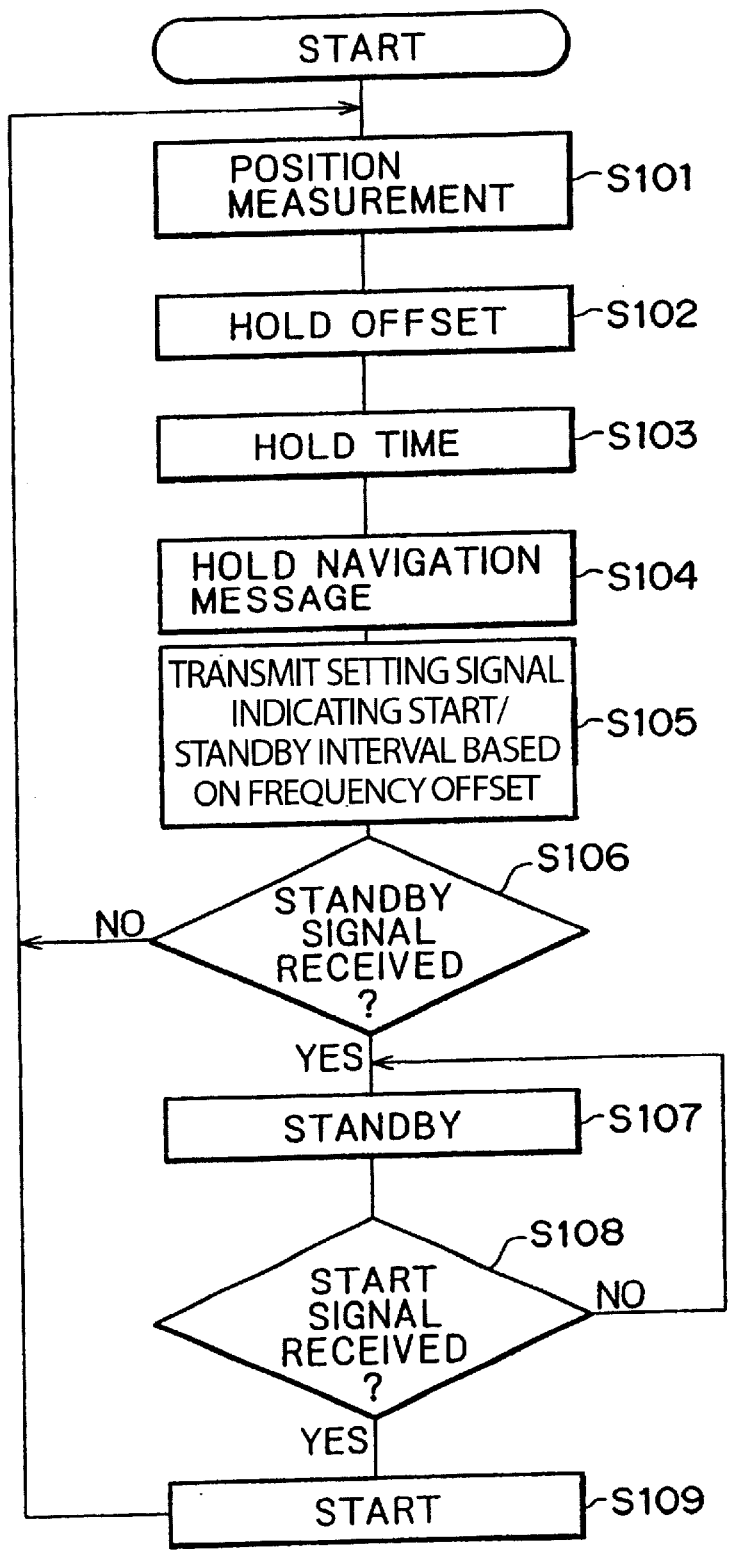
FIG. 4 is a flow chart illustrating a flow of processing in the GPS block.

FIG. 4 illustrates a flow of processing of the GPS block 1. Here, operation of the GPS block 1 for holding the accuracy of the frequency, for holding the accuracy of the time and for holding a navigation message is described.

The GPS block 1 to which power is supplied first executes a first time position measurement (step S101). As a result of the position measurement, the difference between an intermediate frequency determined from the frequency of a high accuracy of a GPS satellite and the synchronizing frequency from the VCO 27 built in the demodulator 22 is stored as an offset into the RAM 24 (step S102). Further, the time of a high accuracy obtained by the first time position measurement is stored into the RAM 24 (step S103). A navigation message obtained by the first time position measurement similarly is stored into the RAM 24 (step S104).

After such storage is performed, the GPS block 1 transmits a setting signal to the GPS control block 2 (step S105). The setting signal includes a notification indicative of a time interval after which the GPS block 1 should be started, a notification that an offset which is a difference between the frequencies has been obtained, a notification that storage of the time is completed and the time, and a notification that storage of a navigation message is completed. Thereafter, the GPS block 1 waits a standby signal from the GPS control block 2 (step S106). Then, if a standby signal is not received, then the position measurement is repeated, that is, the GPS block 1 repeats the processing in steps 101 to 105. If a standby signal is received, then the GPS block 1 disconnects the power supply and enters a standby mode (step S107) and waits for reception of a start signal from the GPS control block 2 (step S108). Then, when a start signal is received from the GPS control block 2 in step S108, the GPS block 1 starts up itself (step S109). Thus, before a start signal is received, the GPS block 1 keeps its standby mode.

Figure 5:
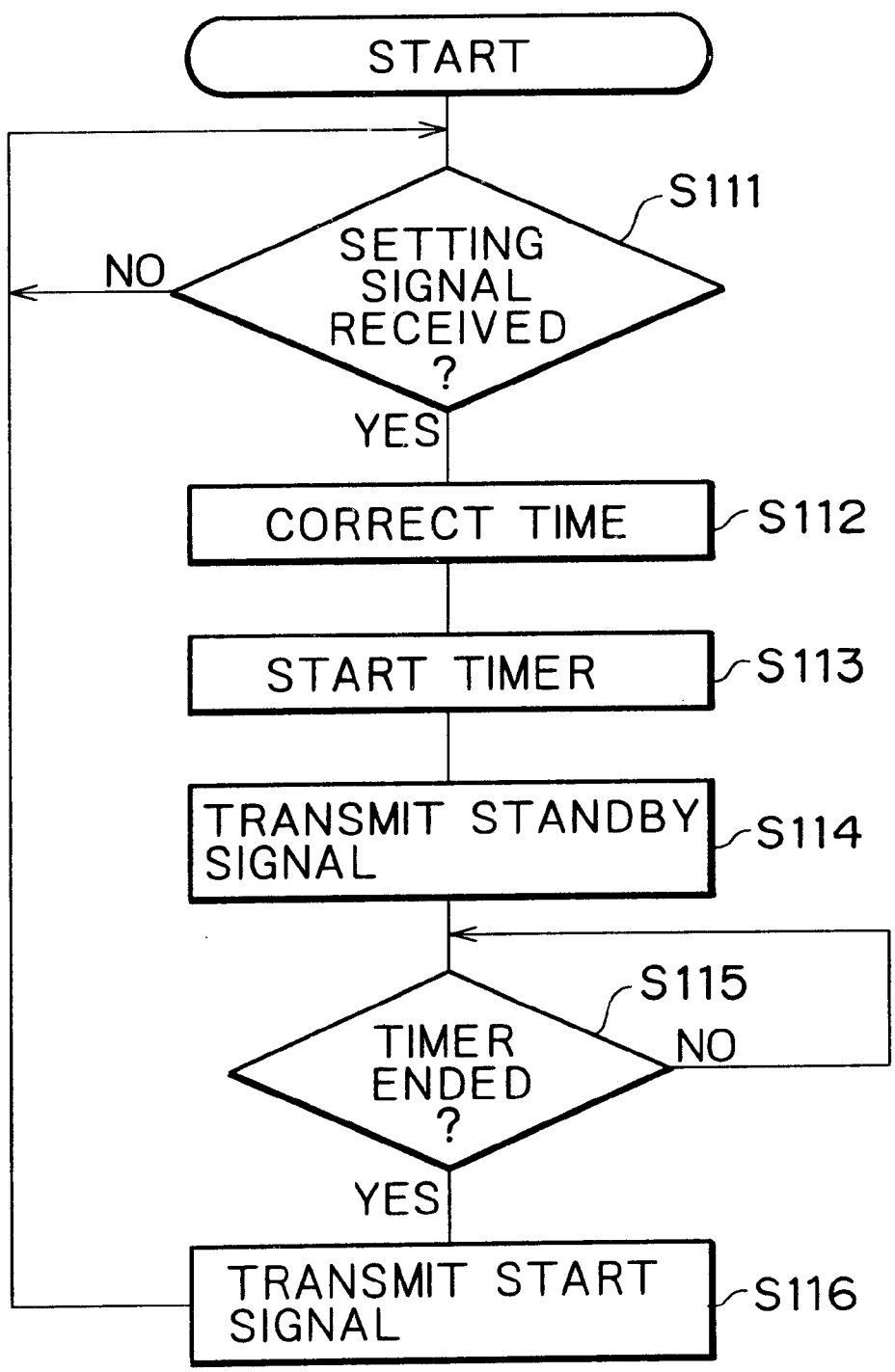
FIG. 5 is a flow chart illustrating a flow of processing in the GPS control block.

FIG. 5 illustrates a flow of processing of the GPS control block 2. The GPS control block 2 first waits for a setting signal transmitted from the GPS block 1 (step S111). When a setting signal is received, the GPS control block 2 corrects the time at the clock 33 based on the accurate time sent thereto from the GPS block 1 (step S112) and starts up the timer 32 (step S113). Then, the GPS control block 2 transmits a standby signal to the GPS block 1 (step S114). Thereafter, the GPS control block 2 discriminates whether or not counting of time of the timer 32 comes to an end (step S115). The discrimination is repeated until counting of time of the timer 32 comes to an end. After the counting of time of the timer 32 comes to an end, that is, after the time interval set from the GPS block 1 elapses, the GPS control block 2 transmits a start signal to the GPS block 1 (step S116). The GPS block 1 receives the start signal and cancels the standby mode described above to thus start up itself. Consequently, the GPS block 1 can repeat start/standby of itself after the predetermined time interval to repetitively update the frequency offset, the time and the navigation message and can thereby hold a frequency reference and time information of a high accuracy and the latest navigation message.

As described above, in the GPS receiver of the present embodiment, with regard to the accuracy in frequently, while the GPS block 1 remains in the standby mode, the error of the frequency oscillator 12 gradually increases. However, since the GPS block 1 starts up itself and performs position measurement after the predetermined time interval, the difference from the prescribed synchronizing frequency arising from the error can always be discriminated as an offset. Also with regard to the accuracy in time, while the GPS block 1 remains in the standby mode, the error of the real time clock 23 of the GPS control block 2 gradually increases. However, since the GPS block 1 starts up itself and performs position measurement after the predetermined time interval, the real time clock 23 of the GPS control block 2 can always be corrected. Further, with regard to the navigation message, if the standby mode continues long, then a satellite used for former measurement may disappear or a navigation message of a high accuracy may suffer from some displacement. However, since the GPS block 1 starts up itself and performs position measurement after the predetermined time interval, occurrence of the problem of such displacement is prevented.

Figure 6:
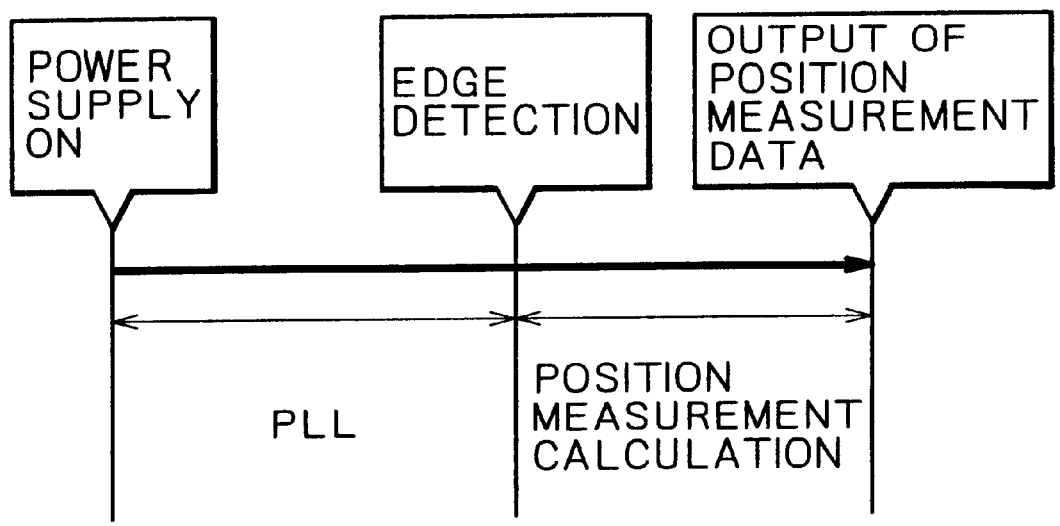
FIG. 6 is a diagrammatic view illustrating position measurement operation in the GPS receiver.
Figure 10A:
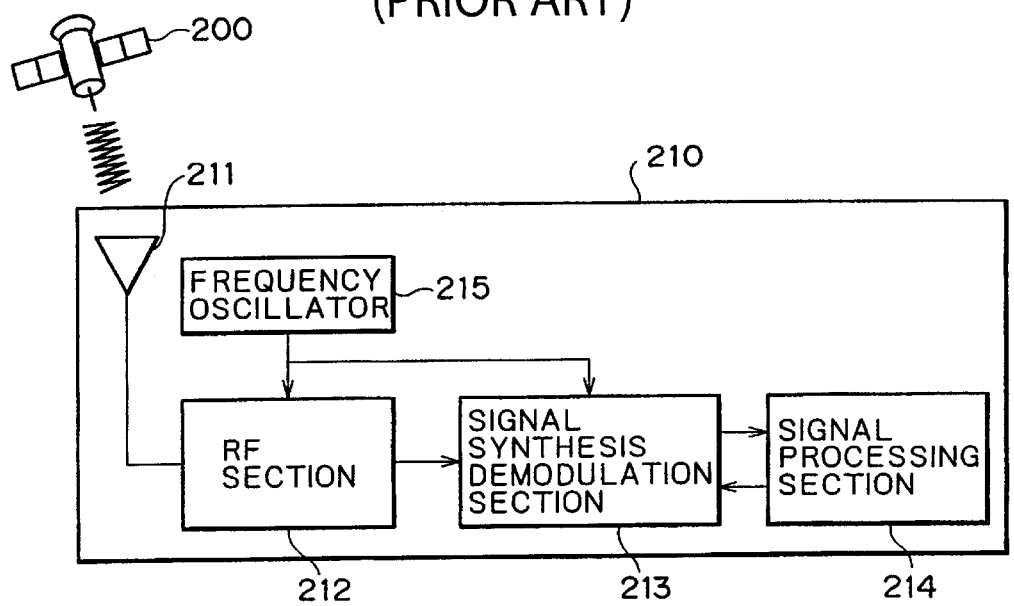
FIGS. 10A and 10B are diagrammatic views showing a general construction of a conventional GPS system and illustrating conventional GPS position measurement operation, respectively.
Figure 10B:
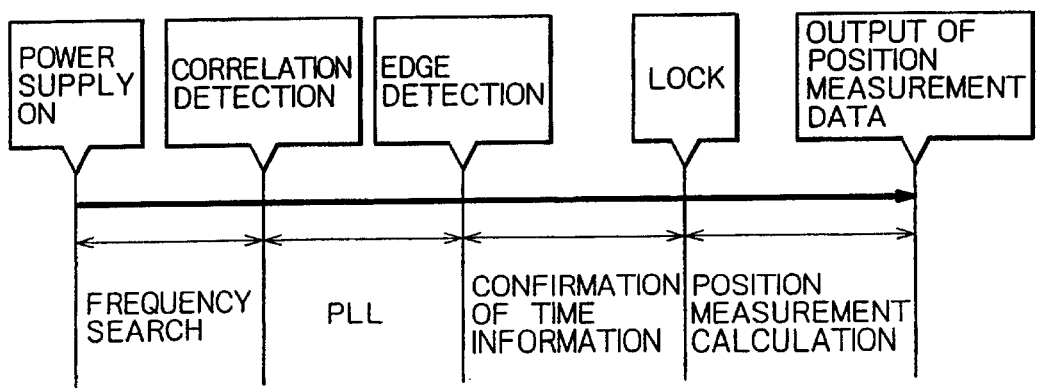

FIG. 6 illustrates a position measurement operation of the GPS receiver of the present embodiment. Although an ordinary GPS receiver first performs a frequency search after power supply is made available as seen in FIG. 10B, the GPS receiver of the present embodiment which performs high speed position measurement need not perform a frequency search because it continuously holds the frequency of a high accuracy in the RAM 24. Therefore, the GPS receiver of the present embodiment omits the frequency search illustrated in FIG. 10B and immediately executes phase adjustment using a PLL as seen in FIG. 6. Then, after the phase adjustment is completed, an edge of demodulation data is detected. After such detection, while the ordinary GPS receiver performs a confirmation operation of time information as seen in FIG. 10B, the GPS receiver of the present embodiment which performs high speed position measurement need not perform the confirmation of time information because it continues to hold the time of a high accuracy. As a result, the GPS receiver of the present embodiment can immediately execute position measurement calculation and output resulting position data as seen in FIG. 6.

On the other hand, when no navigation message is held at a point of time when position measurement is started or when lapse of time invalidates a navigation message, further time for acquiring a navigation message is required in a GPS position measurement operation. In the GPS receiver of the present embodiment, however, since the navigation message is always updated to the latest one, acquisition of a navigation message can be omitted from position measurement. Consequently, the position measurement time can be reduced significantly.

Here, the frequency accuracy is further examined. It is considered that a conventional GPS receiver need not perform a frequency search if an object frequency falls within a range of ±500 Hz in hardware. The accuracy which corresponds to the frequency is approximately ±0.3 ppm with regard to a GPS signal of 1,575.42 MHz. Where the accuracy of the frequency oscillator 12 is ±2.3 ppm, a frequency search need not be performed if an accuracy value higher approximately by one digit is available. In other words, for high speed position measurement, the frequency accuracy is preferably smaller than ±0.3 ppm.

In regard to the time accuracy, in order to obtain time information which includes a TOW, it must be waited that a TOW written at the second word of a subframe appears, and a time of approximately 6 seconds is required. Therefore, if time information for more than one period of a C/A code is always available, then no waiting time for confirmation of time information is required. The time accuracy required here may simply be a time accuracy smaller than one half one period of 1 ms of the C/A code, and this time accuracy eliminates the necessity to wait a TOW in a subframe for 6 seconds. Further, since the phase of the C/A code of 1 ms does not exhibit a reversal within 20 ms of 1 bit of a navigation message, use of the bit boundary of 20 ms can further reduce the required time accuracy. In this instance, if a time accuracy of ±10 ms is available, then an accurate time can be investigated making use of a bit boundary and the necessity to wait a TOW in a subframe for 6 seconds is eliminated. In other words, for high speed position measurement, the time accuracy is preferably smaller than ±10 ms.

Here, the waiting interval with which the accuracy of time information can be maintained is investigated.

In the GPS receiver, the real time clock 23 is normally operating. Where the accuracy of the real time clock 23 is represented by $\Delta Trtc$, the time Tk within which the time accuracy $\Delta Treq$ necessary for high speed position measurement can be maintained can be represented by $$Tk = \Delta Treq / \Delta Trtc$$

Specifically, where the time accuracy $\Delta Treq$ necessary for high speed position measurement is ±10 ms and the accuracy $\Delta Trtc$ of the real time clock 23 is ±50 ppm considering that it is equal to the accuracy of a quartz oscillator used in it, then the time Tk of the expression above is given as $$Tk = 10 \text{ ms}/50 \text{ ppm} = 200(s)$$

Thus, where the real time clock 23 used has the accuracy mentioned above, it is necessary to start up the real time clock 23 after each approximately 3 minutes to receive time information. It is to be noted that, where the real time clock 23 has a higher accuracy, the time interval can be reduced.

Figure 7:
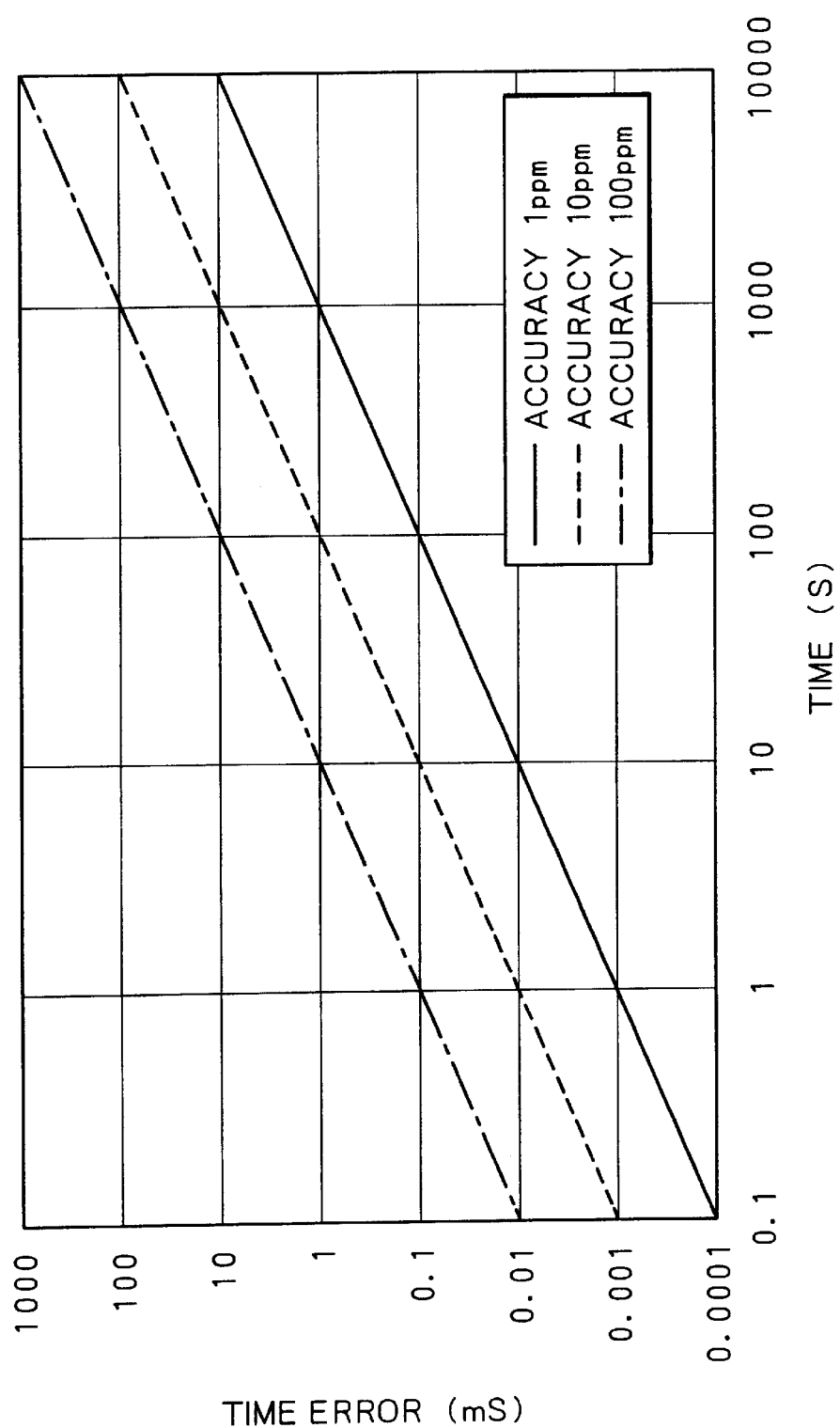
FIG. 7 is a graph illustrating a relationship between the accuracy and a time error of a frequency generator of the GPS receiver.

FIG. 7 illustrates a relationship between the accuracy of the frequency oscillator 12 and the time error. The axis of abscissa represents time (second: s) and the axis of ordinate represents the time error (ms), and three relationships where the accuracy of the frequency oscillator 12 has values of 1 ppm, 10 ppm and 100 ppm are illustrated in FIG. 7. As seen from FIG. 7, as the measurement time increases, the time error increases simply. In particular, it can be understood that, where the frequency oscillator 12 has the accuracy of 10 ppm, if measurement is performed at time intervals of 1 second, then an error of 10 $\mu$s appears, and if measurement is performed at time intervals of 100 seconds, then an error of 1 ms appears. In other words, it can be recognized that, where the time error of, for example, 10 ms is considered as a reference, the time error of 10 ms is reached in 10 s if the frequency oscillator 12 has the accuracy of 100 ppm, in 1,000 s if the frequency oscillator 12 has the accuracy of 10 ppm, and in 10,000 s if the frequency oscillator 12 has the accuracy of 1 ppm. The GPS receiver of the present embodiment can be constructed so as to set a start time based on the accuracy of the frequency oscillator 12 of the GPS receiver with reference to such a time error as just described.

Figure 8:
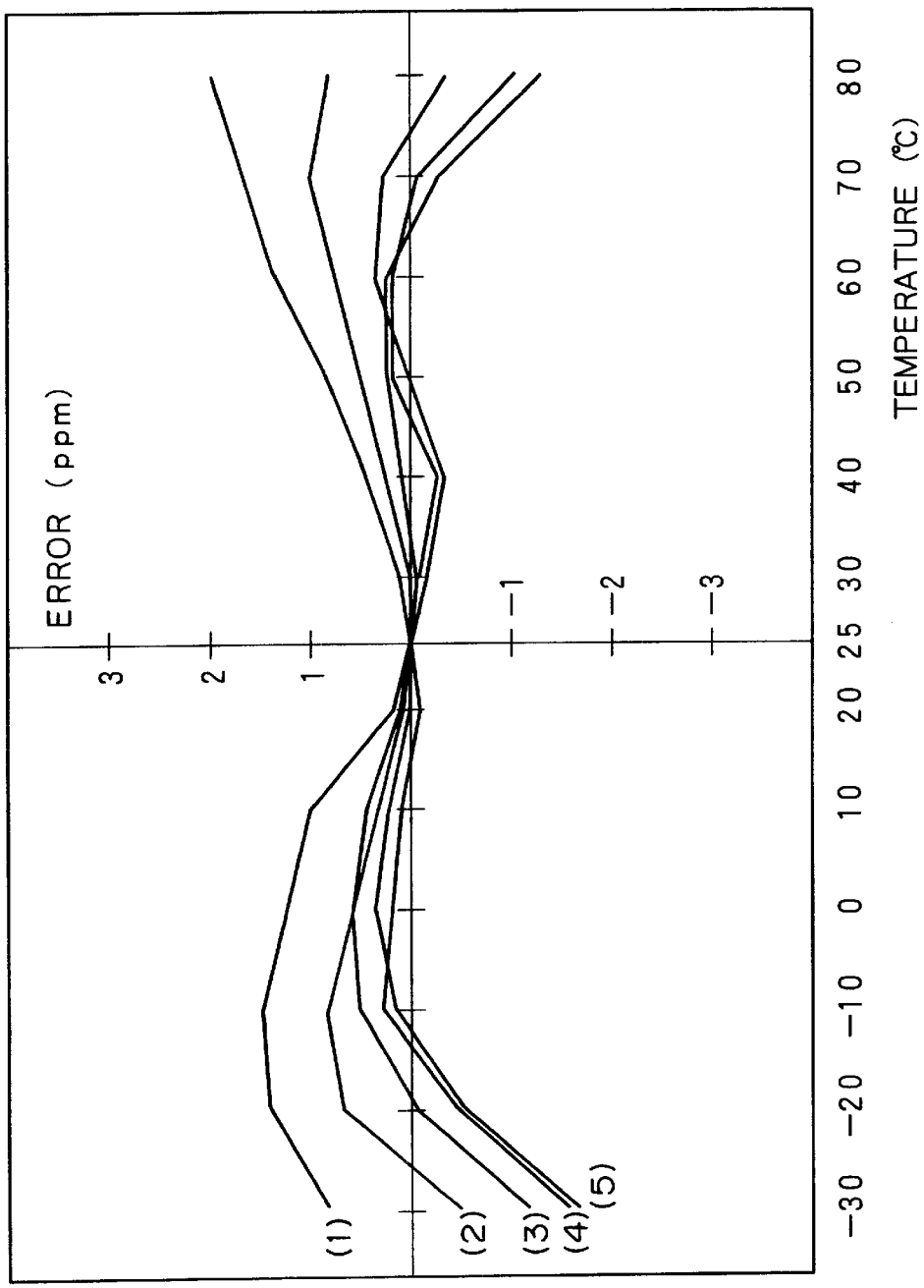
FIG. 8 is a graph illustrating an accuracy variation of the frequency generator by temperature.

FIG. 8 illustrates an accuracy variation of the frequency oscillator 12 by a temperature. The axis of abscissa represents the temperature (°C.) of the atmosphere in which the GPS receiver is placed and the axis of ordinate represents the error (ppm), and five measurement values of different frequency oscillators ((1) to (5)) used for the frequency oscillator 12 are illustrated in FIG. 8. Where the GPS receiver is installed as a car navigation apparatus in a car, it must operate normally within the range of temperature from −20° C. to 80° C. As apparently seen from FIG. 8, it can be recognized that the accuracy of the frequency oscillator 12 varies as the temperature varies. For example, it can be recognized that the accuracy of approximately 0 ppm at 25° C. drops to the accuracy of 2 ppm at −20° C. In the GPS receiver of the present embodiment, the sensor (temperature sensor) 26 is provided in the GPS block 1 so that the GPS block 1 can transmit a setting signal indicative of a time interval determined with an influence of the temperature in the car taken into consideration to the GPS control block 2. As a result, the GPS control block 2 can be started up after a suitable standby time in response to the temperature of the atmosphere in which the GPS receiver is placed.

FIG. 9 illustrates the term of validity of a navigation message. The term within which a navigation message is valid is limited from deterioration of the accuracy of data of the navigation message and the number of visible satellites. In FIG. 9, contents of visible satellites at different times are illustrated. As can be seen from FIG. 9, it can be recognized that the number of visible satellites decreases as time passes. For example, eight satellites of Nos. 18, 13, 7, 10, 24, 27, 19 and 4 are visible at 13:10, but 3 hours later, at 16:45, only four satellites of Nos. 13, 10, 24 and 27 are visible while the other four satellites of No. 18, 7, 19 and 4 have moved out of the sight. While GPS position measurement requires at least four satellites, where the arrangement of the satellites is not preferable, the position measurement accuracy is so poor that position measurement cannot be performed with the four satellites. The variation of the number of such visible satellites arises from the fact that GPS satellites are arranged in 6 orbits×4 satellites around the earth and the period of them is 12 hours. Therefore, in the GPS receiver of the present embodiment, a validity term of approximately 2 hours including a margin for safety is provided, and after lapse of the validity period, data of the navigation message is re-acquired. In other words, in order to normally hold a valid navigation message, the standby time mentioned hereinabove is preferably shorter than 2 hours.

In this manner, with the GPS receiver of the present embodiment, a frequency reference of a high accuracy, time information of a high accuracy and the latest navigation message can always be held, and even immediately after power supply to the GPS receiver is made available by the user, the current position can be outputted in a short time. Thus, the navigation system having high functions can be provided simply and readily.

Power consumption where the GPS receiver of the present embodiment is used is examined here. Where the startup time is represented by Ton and the power consumption of the GPS receiver is represented by Wgps, the average power consumption Wavg can be given by $$Wavg=(Wgps \times Ton)/Tk$$

Specifically, if it is assumed that the startup time Ton is 60 seconds and the power consumption Wgps of the GPS receiver is 580 mW, then $$Wavg=(580\ mW \times 60s)/200s=174\ mW$$

Consequently, in sleep reception (reception after standby) for each 200 seconds, high speed position measurement can be performed with an average power of 174 mW.

It is to be noted that, if the accuracy of the quartz oscillator described above is raised, then the waiting time can be further increased, and the power consumption can be suppressed low when compared with an alternative case wherein power is normally supplied from the power supply 30. Since the power consumption is suppressed low in this manner, position detection or navigation for which the GPS system is used can be executed for a long time. Further, the battery capacity of the GPS receiver can be reduced, and consequently, miniaturization and reduction in weight of the apparatus can be achieved.

While a preferred embodiment of the present invention has been described using specific terms, such description is for illustrative purposes only, and it is to be understood that changes and variations may be made without departing from the spirit or scope of the claims that follow.

What is claimed is:

1. A GPS receiver, comprising:
   reception means for receiving a signal transmitted from a GPS satellite;
   time information storage means for storing time information extracted from the signal received by said reception means;
   offset frequency storage means for storing a difference between a frequency of the signal received by said reception means and a frequency of a frequency oscillator built in said GPS receiver as an offset frequency;
   standby mode setting means for setting said reception means to a standby mode and
   start condition setting means for starting up said reception means based on the offset frequency stored in said offset frequency storage means after a prescribed time elapses after said reception means is set to the standby mode by said standby mode setting means.

2. A GPS receiver according to claim 1, wherein
   said standby mode setting means disconnects power supply to said reception means to set said reception means to the standby mode, and
   said start condition setting means starts up said reception means based on an interval of time determined depending upon a value of the offset frequency stored in said storage means.

3. A GPS receiver, comprising:
   an antenna for receiving a signal transmitted from a GPS satellite;
   a GPS block including a frequency oscillator for generating a frequency and operable to use the frequency from said frequency oscillator to read orbit information placed in the signal in synchronism with the signal frequency from said GPS satellite and place said GPS block itself into a standby mode; and
   a GPS control block having a timer function for rendering said GPS block, after being placed into the standby mode, into an activated mode based on the timer function after a standby time determined with a variation of the oscillation frequency by said frequency oscillator taken into consideration passes.

4. A GPS receiver according to claim 3, further comprising a memory for storing a difference between a signal frequency of the signal from said GPS satellite and a frequency of said frequency oscillator as an offset, and wherein said GPS block updates the offset stored in said memory when said GPS block is caused to enter the activated mode by said GPS control block.

5. A GPS receiver according to claim 3, wherein said GPS block transmits a setting signal indicative of a time interval until said GPS block is to be started up subsequently to said GPS control block, and said GPS control block transmits the standby signal to said GPS block after said GPS control block receives the setting signal from said GPS block.

6. A GPS reception method for a GPS receiver, comprising the steps of:

receiving a hierarchical navigation message from each of a plurality of GPS satellites;

storing the received navigation messages into a memory;

repeating startup and standby of said GPS receiver within a predetermined time to perform position measurement of said GPS receiver from said GPS satellites to update the navigation messages stored in said memory; and outputting, immediately after power supply to said GPS receiver is made available by a user of said GPS receiver, a current position of said GPS receiver based on the navigation messages stored in said memory without performing reception of the navigation message from any of the GPS satellites.

* * * * *